United States Patent Office 3,322,504
Patented May 30, 1967

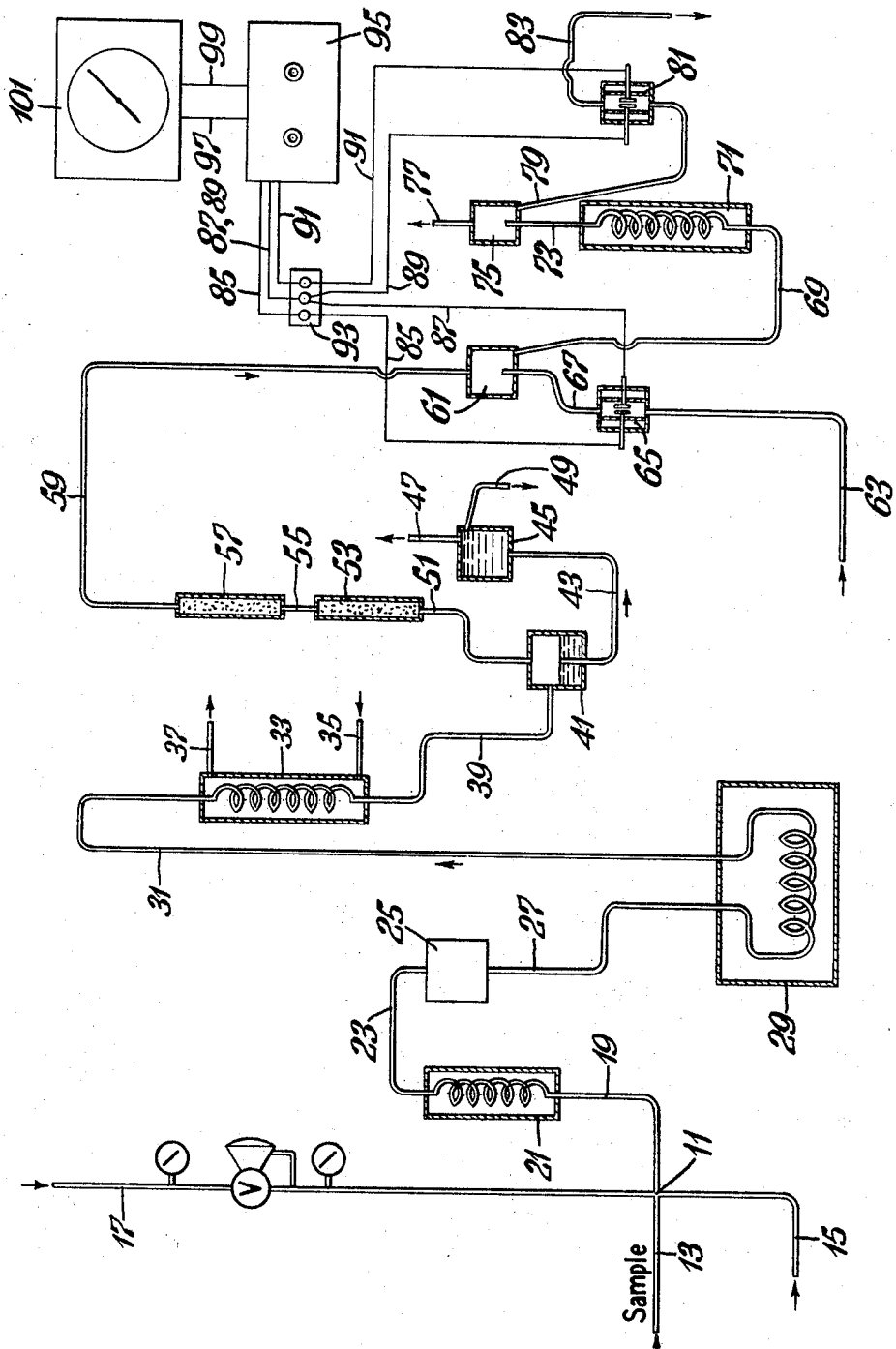

3,322,504
ORGANIC CARBON DETERMINATION AND
MEASUREMENT
Italo A. Capuano, Orange, Conn., assignor to Union
Carbide Corporation, a corporation of New York
Filed Oct. 17, 1963, Ser. No. 316,887
2 Claims. (Cl. 23—230)

The present invention relates to a novel analytical method for the qualitative and quantitative determination of organic carbon constituents present in aqueous solutions such as river water and the like, in relatively low concentrations in the order of 100 parts per million (p.p.m.) or less. The present invention finds particularly advantageous applications in stream pollution analyses where pollution is brought about by industrial waste water outfalls, industrial process stream leakages and accidental spillages.

Industry, particularly the chemical manufacturing industry, has long been plagued with the problems attending effective stream pollution control of rivers and streams adjacent plant sites. The most rigorous precautions in plant design and in operating techniques have not fully obviated the problems which arise when pollution control arrangements operate at less than full effectiveness or when process fluids inadvertently leak or spill into plant water systems ultimately discharged into nearby water sources. One of the most effective control techniques for stream pollution work has been found to be the continuous monitoring of plant water outfalls for the detection and measurement of pollution-causing industrial wastes. By far the majority of pollution-causing constituents are organic carbon compounds, such as alcohols, ketones, aldehydes, and the like.

Prior to the time of the present invention, there has been available to industry no completely satisfactory and accurate analytical technique for detection and measurement of these stream-polluting compounds occurring in the low concentrations of 100 p.p.m. and less.

Most currently used control techniques comprehend the use of single volume samples extracted from the water outfalls from time to time, and analyzed for contaminant content according to batch-type analytical techniques. The errors attending such stream-sampling methods are obvious, the most important being the possibility of occurrence of a high concentration contamination volume at a time between samplings.

It is therefore a primary object of the present invention to provide a method for the detection and measurement of total organic carbon concentrations occurring in aqueous streams, river water, plant outfall water and the like.

It is a further object of the present invention to provide such an analytical technique where the concentration of stream polluting organic carbon constituents are found in the 100 parts per million range and below.

It is a still further and important object of this invention to provide such an analytical technique as described above which is continuous in its operation and which provides continuous indicia of the total organic carbon content of the aqueous stream or water source of interest.

In general, the analytical method according to my invention comprehends the steps of heating a flowing stream of an aqueous solution of interest in the presence of oxygen to oxidize the organic carbon constituents contained therein to carbon dioxide, reacting said carbon dioxide with an electrolytic solution and then conductometrically analyzing the reaction product of the carbon dioxide and the electrolytic solution, the electrolytic solution alone being first passed through a reference measuring element to effect a comparison base, and using the conductometrically produced differential signal as an indication of the concentration of organic carbon constituents present at any time in the aqueous solution being analyzed.

With the foregoing and other objects in view, which will become more apparent hereinafter, my invention will now be described with greater particularity and with reference to the appended drawing which is a combination flow diagram and electrical schematic representation of an apparatus arrangement suitable for performing a typical mode of the method according to the present invention.

Into a common admixing or junction point 11, I introduce constantly metered and continuously flowing streams of aqueous solution sample through conduit 13, barium hydroxide solution through conduit 15 and gaseous oxygen through conduit 17. From mixing point 11 a conduit 19 directs the admixed streams into a reaction chamber 21 designed to provide sufficient time for reaction of the barium hydroxide solution with any inorganic carbon constituents which may be contained in the sample stream delivered through conduit 13. The reaction products of the barium hydroxide solution and inorganic carbon constituents normally occurring in river water and the like are precipitatable compounds which can be filtered. From the reaction chamber 21 conduit 23 directs the stream through a filter 25 which is designed to remove the precipitated inorganic carbonates. After filtering at 25 the stream passes through conduit 27 to a furnace 29 wherein heat is applied sufficient to oxidize the organic carbon constituents present in the stream to carbon dioxide. From furnace 29 conduit 31 conducts the now vaporized stream into a cooling chamber 33 to condense water vapor present in said stream. As shown in the drawing, cooling chamber 33 may be a coil surrounded by a suitable cooling water jacket provided with a cooling water inlet 35 and cooling water outlet 37. Conduit 39 then conducts the stream to a liquid-gas separator 41 wherein the gaseous components of the stream are separated from the condensed water. The water thus removed is discharged through conduit 43 to a suitable trap 45 having a vent 47 and a drain 49. The remaining gaseous stream is directed from liquid-gas separator 41 through conduit 51 to a chamber 53 containing manganese dioxide wherein any incidental oxides of nitrogen and sulfur formed in the heating are removed. Conduit 55 then directs the stream through a chamber 57 containing powdered antimony which removes any chlorine produced incidental to the reduction of chlorine impurities which may be present in the sample. From chamber 57 conduit 59 conducts the stream to a mixing chamber 61. A suitable electrolytic solution stream is also continuously directed into mixing chamber 61 from a source 63 through a reference conductivity cell 65. Conduit 67 is arranged between reference conductivity cell 65 and mixing chamber 61 providing access to the mixing chamber for the electrolytic solution stream. Conduit 69 directs the flow of admixed gases and the electrolytic solution from the mixing chamber 61 to a reaction chamber 71 designed to provide sufficient time for the reaction of the electrolytic solution with the carbon dioxide of the gaseous stream. The reacted solution is then passed through conduit 73 to a liquid-gas separator 75 wherein any unreacted gas present is separated from the solution and disposed of through a vent 77. Conduit 79 then directs the flow of the electrolytic solution containing the reacted carbon dioxide to a measuring conductivity cell 81, from which the solution is discarded through conduit 83.

The reference and measuring conductivity cells 65 and 81 are electrically connected respectively as arms in a differential A.C. conductivity bridge through electrical conductors 85, 87, 89, 91, through terminal block 93. Other elements comprised in the bridge are conventional in nature and are represented for the purposes of this disclosure by the block symbol 95. Conductors 97 and 99 connect the output points of the bridge to any suitable recording or indicating device such as a recording potentiometer 101.

A working embodiment of apparatus to perform the method of my invention as described above and shown in the drawing was designated and built specifically for monitoring chemical plant water outfalls into a nearby river. From previous other types of analyses it was known that samples encountered in continuous operation could be expected to contain those impurities for which certain specific removal steps were incorporated into the design. It was expected for instance that the stream being monitored might contain inorganic carbon constituents in the form of dissolved carbon dioxide or soluble carbonates such as sodium carbonate and on this expectation provision was included in the design for precipitation and removal of such constituents by the barium hydroxide method and the filtering step.

$$Ba(OH)_2 + CO_2 \rightarrow BaCO_3 + H_2O$$

$$Ba(OH)_2 + Na_2CO_3 \rightarrow BaCO_3 + NaOH$$

Similarly, the manganese dioxide chamber 53 was included to remove any oxides of nitrogen and sulfur formed in the heating step, the occurrence of trace quantities of nitrogen and sulfur in the sampled stream being also expected.

The powdered antimony chamber 57 was included in the flow arrangement to remove any chlorine produced incidentally by the reduction of chlorine compound impurities which were also expected in the sample stream.

Persons skilled in the analytical arts will recognize that the impurities removal steps described hereinabove are specific to the described application of my invention and do not impose any limitations thereon, it being understood that other impurities removal steps may be required for other particular conditions or, in instances where the sampled stream is known to contain only organic carbon impurities and none other, omitted altogether.

The important steps then of the method of my invention are the application to a combination of oxygen and the aqueous stream being analyzed of a heat sufficient to oxidize the organic carbon constituents present in the stream to carbon dioxide, the reaction of the carbon dioxide thus produced continuously with an electrolytic solution and the differential conductometric analysis of the reaction product of the carbon dioxide and the electrolytic solution to produce sensible indicia of amplitudes proportional to the concentration of the organic carbon constituents present in the analyzed sample stream.

It has also been determined in the experimental evaluation of my invention that the oxidation or heating step to produce carbon dioxide can be performed advantageously with a metal oxide catalyst present in the oxidation zone. Where a metal tube, such as stainless steel, is used as the stream-conducting member in the heating zone the metal oxide catalyst may be incidentally generated by the internal oxidation of the tube material. Where a nonmetallic tubing or conduit means is used in the heating zone, any conventional metal oxide material may be introduced into the oxidation zone to effect the catalytic action. In an illustrative reaction where the organic carbon constituent in the sample stream is methyl alcohol, the oxidation may be represented as $$CH_3OH + 1\tfrac{1}{2}O_2 \xrightarrow[\text{Catalyst}]{\text{Heat (900° C.)}} CO_2 + 2H_2O$$

The catalytic presence described above, while found to enhance oxidation, is not essential to the practice of my invention.

It should also be noted that while I have described the practice of my invention using potassium hydroxide as the electrolytic solution, $$KOH + CO_2 \rightarrow K_2CO_3 + H_2O$$

other electrolytically conductive solutions may be used with equally good results, it being necessary only that a reaction is effected which will produce an increase in solution conductivity proportional to the carbon concentration therein.

In a working embodiment of apparatus to perform the method of the present invention, sample at a flow-rate of 9 milliliters/minute, barium hydroxide solution at 6 milliliters/minute, oxygen at 170 milliliters/minute and potassium hydroxide solution at 10 milliliters/minute were fed respectively into conduits 13, 15, 17 and 63. Both the barium hydroxide and potassium hydroxide solutions used were prepared from analytical reagent grade chemicals and distilled water. The barium hydroxide solution was of concentration 0.000835 normal and the potassium hydroxide solution was of concentration 0.00375 normal. The oxidation column in the furnace 29 was formed from 15 feet of ¼ inch type 316 stainless steel tubing. The manganese dioxide and powdered antimony metal chambers 55, 57 were each made from 6 inch pieces of ¾ inch tubing. No specific oxidation catalyst was included in the apparatus but later examination showed a film of metal oxide material on the furnace 15 stainless steel tube interior wall formed when the heat was applied. A recorder having a 0–20 millivolt full scale deflection for 0–100 chart divisions was installed and calibrated with accurately measured methyl alcohol concentrations introduced into the sample stream. Table I below is the calibration chart.

TABLE I

| Added (known) Carbon Concentration (methyl alcohol), p.p.m. | Chart Divisions | Millivolts |
| --- | --- | --- |
| 25 | 24 | 5 |
| 50 | 51 | 10.1 |
| 80 | 80 | 18 |
| 100 | 100 | 20 |

EXAMPLE I

In order to test the output reproducibility of the apparatus 50 p.p.m. samples of methyl alcohol were introduced into the sample stream at selected intervals and the deviations noted. See Table II, below.

TABLE II

| Run | Organic Carbon, p.p.m. | | |
| --- | --- | --- | --- |
| | Added | Found | Difference |
| 1 | 50.0 | 52.0 | +2.0 |
| 2 | 50.0 | 51.0 | +1.0 |
| 3 | 50.0 | 50.0 | 0.0 |
| 4 | 50.0 | 49.0 | −1.0 |

EXAMPLE II

The apparatus was next tested to evaluate the method's efficiency in determining carbon content from several different organic carbon compositions measured and added to the sample intake water. See Table III, below.

TABLE III

| Sample No. | Compound | Organic Carbon, p.p.m. | | | |
|---|---|---|---|---|---|
| | | Molecular Weight | Added | Found | Difference |
| 1 | Methanol | 32.04 | 50.0 | 50.0 | 0.0 |
| 2 | Acetaldehyde | 44.05 | 50.0 | 49.0 | −1.0 |
| 3 | Sodium Benzoate | 144.11 | 50.0 | 49.0 | −1.0 |
| 4 | Sodium Citrate Dehydrated | 294.11 | 50.0 | 48.0 | −2.0 |
| 5 | Polyethylene Glycol | 400.00 | 50.0 | 49.0 | −1.0 |

From the foregoing disclosure it can be appreciated that the present invention provides a novel and useful method for determining the extent of 0–100 p.p.m. concentrations of organic carbon pollutes in aqueous streams. The invention more particularly provides a stream pollution control technique which is accurate, low in cost and furnishes consistently reproducible results.

The disclosure is presented for illustrative purposes without intent to limit my invention other than by the appended claims.

What is claimed is:

1. A method for continuous qualitative and quantitative determinations of concentrations of organic carbon constituents in an aqueous solution which also contains inorganic carbon constituents, nitrogen, sulfur and chloride constituents which method comprises the steps of continuously admixing flowing streams of said aqueous solution, a barium hydroxide solution and gaseous oxygen; removing precipitated reaction products of said barium hydroxide solution and said inorganic carbon constituents; heating the admixed flowing stream after such removal to oxidize said organic carbon constituents to carbon dioxide; separating and removing water from said admixed stream; passing those constituents remaining after the water removal through manganese dioxide to remove nitrogen and sulfur impurities; passing those constituents remaining after the water removal and the nitrogen and sulfur impurities removal through powdered antimony metal to remove chlorine impurities; reacting said stream with a constant flow of dilute potassium hydroxide solution to produce an increase in conductivity of said potassium hydroxide solution proportional to carbon concentration therein; and differentially conductometrically analyzing the reaction product of said carbon dioxide and said potassium hydroxide solution, said potassium hydroxide solution alone being used as a comparison base, to determine the concentration of organic carbon constituents in the aqueous solution analyzed.

2. A method for continuous qualitative and quantitative determinations of concentrations of organic carbon constituents in an aqueous solution which also contains inorganic carbon constituents, nitrogen, sulfur and chloride constituents which method comprises the steps of continuously admixing flowing streams of said aqueous solution, a barium hydroxide solution and gaseous oxygen; removing precipitated reaction products of said barium hydroxide solution and said inorganic carbon constituents; heating the admixed flowing stream after such removal in the presence of a metal oxide catalyst to oxidize said organic carbon constituents to carbon dioxide; separating and removing water from said admixed stream; passing those constituents remaining after the water removal through manganese dioxide to remove nitrogen and sulfur impurities; passing those constituents remaining after the water removal and the nitrogen and sulfur impurities removal through powdered antimony metal to remove chlorine impurities; reacting said stream with a constant flow of dilute potassium hydroxide solution to produce an increase in conductivity of said potassium hydroxide solution proportional to carbon concentration therein; and differentially conductometrically analyzing the reaction product of said carbon dioxide and said potassium hydroxide solution, said potassium hydroxide solution alone being used as a comparison base, to determine the concentration of organic carbon constitutents in the aqueous solution analyzed.

References Cited

UNITED STATES PATENTS

| | | | |
|---|---|---|---|
| 1,375,933 | 4/1921 | Rideal et al. | 23—232 |
| 1,560,660 | 11/1925 | Cain | 23—232 |
| 2,230,593 | 2/1941 | Hassler | 23—254 |
| 2,559,090 | 7/1951 | Potter. | |
| 3,140,918 | 7/1964 | Capuano | 23—230 |
| 3,172,732 | 3/1965 | Hines et al. | 23—230 |
| 3,205,045 | 9/1965 | Lossberg | 23—253 |

MORRIS O. WOLK, *Primary Examiner.*

JOSEPH SCOVRONEK, *Examiner.*